US010197210B2

(12) United States Patent
Hoffman

(10) Patent No.: US 10,197,210 B2
(45) Date of Patent: Feb. 5, 2019

(54) MAGNETIC CLOSURES FOR PIPE INSULATION

(71) Applicant: Hydra Heating Industries, LLC, Atlanta, GA (US)

(72) Inventor: Michael Hoffman, Atlanta, GA (US)

(73) Assignee: Hydra Heating Industries, LLC, Atlanta, GA (US)

( * ) Notice: Subject to any disclaimer, the term of this patent is extended or adjusted under 35 U.S.C. 154(b) by 202 days.

(21) Appl. No.: 15/211,484

(22) Filed: Jul. 15, 2016

(65) Prior Publication Data
US 2017/0016557 A1    Jan. 19, 2017

Related U.S. Application Data

(60) Provisional application No. 62/193,242, filed on Jul. 16, 2015, provisional application No. 62/202,114, filed on Aug. 6, 2015.

(51) Int. Cl.
*F16L 9/17* (2006.01)
*F16L 59/02* (2006.01)
*F16L 59/14* (2006.01)

(52) U.S. Cl.
CPC ........... *F16L 59/024* (2013.01); *F16L 59/028* (2013.01); *F16L 59/14* (2013.01)

(58) Field of Classification Search
CPC .............................. F16L 59/024; F16L 59/028
USPC .......................... 138/149, 157, 158, 167, 169
See application file for complete search history.

(56) References Cited

U.S. PATENT DOCUMENTS

| | | |
|---|---|---|
| RE23,636 E | 3/1953 | Wilson |
| 2,649,330 A | 8/1953 | Schamel |
| 2,880,015 A | 3/1959 | Harben |
| 2,959,832 A | 11/1960 | Baermann |
| 3,086,247 A | 4/1963 | Rubens |
| 3,095,668 A | 7/1963 | Dorsett |
| 3,112,163 A | 11/1963 | Alderfer |
| 3,116,739 A | 1/1964 | Luis |
| 3,147,176 A | 9/1964 | Haslam |
| 3,152,716 A | 10/1964 | Feldhahn |
| 3,254,440 A | 6/1966 | Duggar |
| 3,260,788 A | 7/1966 | Stetson |
| 3,285,456 A | 11/1966 | Pewitt |
| 3,298,712 A | 1/1967 | Greenstadt |
| 3,314,196 A | 4/1967 | Betz et al. |
| 3,365,684 A | 1/1968 | Stemke et al. |
| 3,384,934 A * | 5/1968 | Bush, Jr. .................. E04B 9/248 24/303 |
| 3,456,373 A | 7/1969 | Epton |
| 3,531,177 A | 9/1970 | Akin, Jr. |
| 3,553,872 A | 1/1971 | Ebner |
| 3,565,517 A | 2/1971 | Gitlin et al. |

(Continued)

*Primary Examiner* — James Hook
(74) *Attorney, Agent, or Firm* — Thomas Horstemeyer, LLP

(57) ABSTRACT

Various pipe insulations and apparatuses for insulating pipe that employ magnetic closures are disclosed herein. Pipe insulation is configured to fit substantially around a pipe. In one case, the pipe insulation has a lengthwise split. A magnetic closure is attached to a first lengthwise edge of the pipe insulation along a first side of the lengthwise split. The magnetic closure is configured to magnetically mate with another closure attached to a second lengthwise edge along a second side of the lengthwise split to hold the pipe insulation substantially around the pipe.

12 Claims, 5 Drawing Sheets

(56) References Cited

U.S. PATENT DOCUMENTS

| | | |
|---|---|---|
| 3,636,727 A | 1/1972 | Naughton |
| 3,651,592 A | 3/1972 | McCormick et al. |
| 3,727,658 A | 4/1973 | Eldridge, Jr. |
| 3,902,940 A | 9/1975 | Heller, Jr. et al. |
| 3,924,377 A | 12/1975 | Gill |
| 3,935,361 A | 1/1976 | Dorfman et al. |
| 3,941,159 A * | 3/1976 | Toll .................. F16L 59/022 138/147 |
| 3,943,912 A | 3/1976 | Nakayama |
| 3,950,894 A | 4/1976 | DiMaio |
| 3,965,599 A | 6/1976 | Ebner |
| 3,969,572 A | 7/1976 | Rostek |
| 3,987,567 A | 10/1976 | Fritts |
| 4,040,194 A | 8/1977 | Penton et al. |
| 4,142,565 A * | 3/1979 | Plunkett, Sr. ......... F16L 59/026 137/375 |
| 4,154,226 A | 5/1979 | Hennig et al. |
| 4,162,672 A | 7/1979 | Yazaki |
| 4,187,187 A | 2/1980 | Turbeville |
| 4,197,618 A | 4/1980 | Bourguignon |
| 4,219,218 A | 8/1980 | Waldon |
| 4,234,378 A | 11/1980 | Iwasaki et al. |
| 4,298,554 A * | 11/1981 | Vogel ..................... C04B 28/26 106/38.3 |
| 4,310,137 A | 1/1982 | Frye |
| 4,342,904 A | 8/1982 | Onsager |
| 4,473,980 A | 10/1984 | Foster |
| 4,478,384 A | 10/1984 | Julseth |
| 4,584,223 A | 4/1986 | Krapf |
| 4,635,410 A | 1/1987 | Chumbley |
| 4,640,808 A | 2/1987 | Okumura et al. |
| 4,673,542 A | 6/1987 | Wigner et al. |
| 4,678,150 A | 7/1987 | Newman et al. |
| 4,703,575 A | 11/1987 | Diamond |
| 4,735,284 A | 4/1988 | Gahlau et al. |
| 4,769,166 A | 9/1988 | Harrison |
| 4,800,662 A | 1/1989 | Belrose |
| 4,810,015 A | 3/1989 | McNeil |
| 4,832,396 A | 5/1989 | Moreno et al. |
| 4,873,102 A | 10/1989 | Chang et al. |
| 4,884,824 A | 12/1989 | Radke |
| 4,941,236 A | 7/1990 | Sherman et al. |
| 4,959,997 A | 10/1990 | Aisa et al. |
| 4,961,849 A | 10/1990 | Hull et al. |
| 5,009,625 A | 4/1991 | Longuet-Higgins |
| 5,021,021 A | 6/1991 | Ballard |
| 5,031,874 A | 7/1991 | Shannon |
| 5,035,017 A | 7/1991 | Komuro |
| 5,092,019 A | 3/1992 | Levy |
| 5,127,652 A | 7/1992 | Unger |
| 5,267,763 A | 12/1993 | Klein |
| D343,864 S | 2/1994 | Rebong |
| 5,295,342 A | 3/1994 | Roche et al. |
| 5,342,665 A | 8/1994 | Krawitz |
| 5,447,790 A | 9/1995 | Funae et al. |
| 5,452,508 A | 9/1995 | Wu |
| 5,503,891 A | 4/1996 | Marshall et al. |
| 5,534,097 A | 7/1996 | Fasano et al. |
| 5,538,132 A | 7/1996 | Propp et al. |
| 5,545,157 A | 8/1996 | Van Iten |
| 5,601,894 A * | 2/1997 | Maruschak ............. A61M 5/44 428/36.9 |
| 5,800,896 A | 9/1998 | Kobayashi |
| 5,806,346 A | 9/1998 | Schlinger et al. |
| 5,832,831 A | 11/1998 | Boyle et al. |
| 5,833,795 A | 11/1998 | Smith et al. |
| 5,852,890 A | 12/1998 | Pynenburg |
| 5,891,315 A | 4/1999 | Nash |
| 5,919,541 A | 7/1999 | Emory |
| 5,984,043 A | 11/1999 | Ruhe et al. |
| 5,984,855 A | 11/1999 | DiNapoli |
| 6,042,057 A | 3/2000 | Rice |
| 6,062,688 A | 5/2000 | Vinas |
| 6,113,142 A | 9/2000 | Tolbert |
| 6,122,955 A | 9/2000 | Hoog et al. |
| 6,305,656 B1 | 10/2001 | Wemyss |
| 6,344,021 B1 | 2/2002 | Juster et al. |
| 6,367,126 B1 | 4/2002 | Rivkin |
| 6,406,418 B1 | 6/2002 | Getek |
| 6,406,783 B1 | 6/2002 | Phillips et al. |
| 6,484,428 B1 | 11/2002 | Greenwald et al. |
| 6,502,933 B2 | 1/2003 | Lim et al. |
| 6,553,724 B1 | 4/2003 | Bigler |
| 6,575,328 B1 | 6/2003 | Foraker |
| 6,575,758 B1 * | 6/2003 | Hastings .................. G09F 7/18 434/408 |
| 6,599,419 B2 | 7/2003 | Hagans |
| 6,632,168 B2 | 10/2003 | Roberts et al. |
| 6,663,128 B2 | 12/2003 | Dichter |
| 6,673,258 B2 | 1/2004 | Purizhansky |
| 6,846,379 B1 | 1/2005 | Bove et al. |
| 6,857,809 B2 | 2/2005 | Granata |
| 6,889,457 B2 | 5/2005 | Boddie |
| 6,897,752 B2 | 5/2005 | Dixon et al. |
| 7,063,878 B1 | 6/2006 | Poulakis |
| 7,086,422 B2 * | 8/2006 | Huber ............... A61M 16/0875 128/207.14 |
| 7,153,113 B2 | 12/2006 | Graham et al. |
| 7,187,261 B2 | 3/2007 | Cassar |
| 7,275,334 B2 | 10/2007 | Horst |
| 7,307,501 B2 | 12/2007 | Doi |
| 7,332,101 B2 | 2/2008 | Singh et al. |
| 7,461,750 B2 | 12/2008 | Armstrong |
| 7,469,869 B2 | 12/2008 | Killion |
| 7,503,136 B1 | 3/2009 | McDonald |
| 7,641,534 B2 | 1/2010 | Holman |
| 7,694,440 B1 | 4/2010 | Wu |
| 7,740,215 B2 | 6/2010 | Lang |
| 7,772,504 B1 | 8/2010 | Tashjian |
| 7,992,265 B2 | 8/2011 | Suenaga |
| 8,079,568 B2 | 12/2011 | Heinrich et al. |
| 8,152,709 B2 | 4/2012 | Szeto |
| 8,167,165 B1 * | 5/2012 | Peterson ............. A47J 41/0061 150/165 |
| 8,307,600 B2 | 11/2012 | Heartsfield |
| 8,366,283 B2 | 2/2013 | Sierra |
| 8,376,409 B2 | 2/2013 | Rosset |
| 8,408,627 B2 | 4/2013 | Mann |
| 8,458,863 B2 | 6/2013 | Hunts |
| 8,613,881 B2 | 12/2013 | Soong |
| 8,684,783 B2 | 4/2014 | Ehrsam |
| 8,689,464 B2 | 4/2014 | Rodman et al. |
| 8,727,404 B2 | 5/2014 | Martin |
| 8,734,669 B2 | 5/2014 | Tomiyama et al. |
| 8,785,623 B2 | 7/2014 | Olsson et al. |
| 8,943,723 B2 | 2/2015 | Valentine et al. |
| 9,251,458 B2 | 2/2016 | Finn et al. |
| 9,271,586 B2 | 3/2016 | Ryan |
| 2004/0006903 A1 | 1/2004 | Haytas |
| 2005/0170739 A1 | 8/2005 | Zoellner |
| 2008/0302436 A1 * | 12/2008 | Elowitz ................ F16M 11/242 138/110 |
| 2010/0290212 A1 | 11/2010 | Francis |
| 2011/0083254 A1 | 4/2011 | Trutna et al. |
| 2011/0174953 A1 | 7/2011 | Ruiz et al. |
| 2011/0283627 A1 | 11/2011 | Shaw |
| 2012/0061388 A1 * | 3/2012 | Jacques ................ F16L 59/024 220/4.21 |
| 2012/0143165 A1 | 6/2012 | Macura et al. |
| 2013/0061431 A1 | 3/2013 | Naftali et al. |
| 2014/0054434 A1 | 2/2014 | Chen |
| 2014/0137450 A1 | 5/2014 | Knez |
| 2014/0227934 A1 | 8/2014 | Rudiseill |
| 2015/0367245 A1 | 12/2015 | Ahn et al. |
| 2016/0001093 A1 | 1/2016 | Wulfcrona et al. |
| 2016/0198782 A1 | 7/2016 | Thompson |
| 2016/0242504 A1 | 8/2016 | Cowley et al. |
| 2016/0354495 A1 | 12/2016 | Harmer et al. |

* cited by examiner

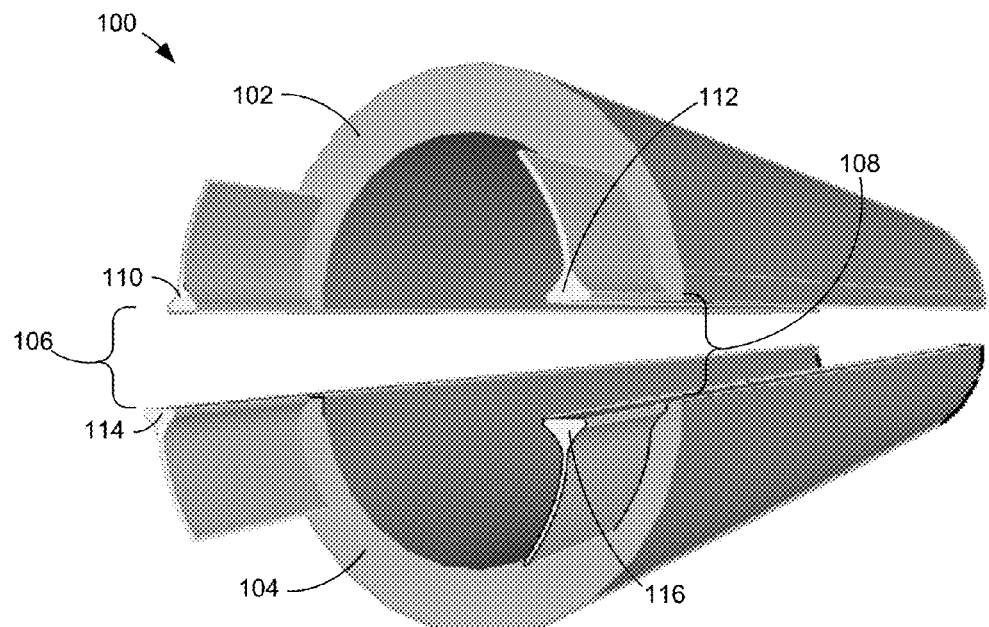
FIG. 1
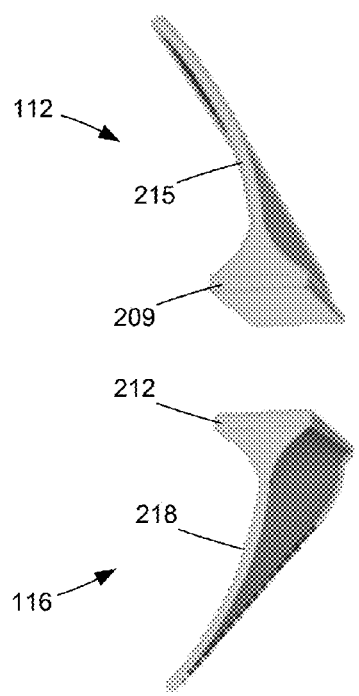 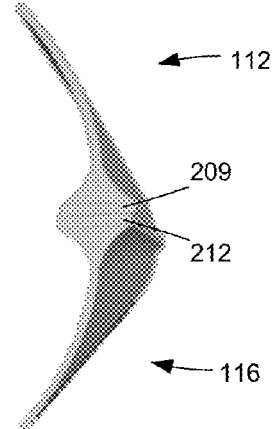 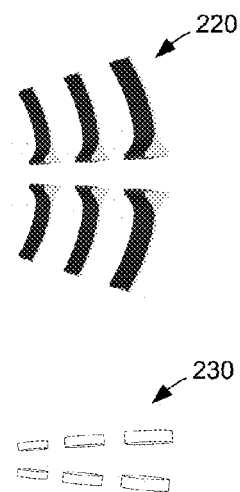
FIG. 2A  FIG. 2B  FIG. 2C

MAGNETIC CLOSURES FOR PIPE INSULATION

CROSS-REFERENCE TO RELATED APPLICATIONS

This application claims the benefit of U.S. Provisional Application No. 62/193,242, filed Jul. 16, 2015, the entire contents of which are incorporated herein by reference. This application also claims the benefit of U.S. Provisional Application No. 62/202,114, filed Aug. 6, 2015, the entire contents of which are incorporated herein by reference.

BACKGROUND

Pipe insulation may be used to fully or partially envelop various types of pipes and may be used for many different purposes. Where high or low environmental temperatures may occur, pipe insulation may protect pipes or pipe contents from condensation, freezing, melting, expansion, contraction, and other effects. Where pipes themselves operate at high or low temperatures, pipe insulation may similarly protect pipes and may further protect people and the nearby area from direct contact with the pipes. Energy may be saved using pipe insulation, for example, when pipes are used for heating, among other uses. Pipe insulation can also serve to control noise, protect the pipes from physical damage, and for other purposes. Where pipe insulation is split or multiple pieces, closures can be used. Currently, pipe insulation closures include tape, glue, or clamps.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

FIG. 1 illustrates a perspective view of an example of pipe insulation having magnetic closures according to an embodiment.

FIGS. 2A and 2B illustrate perspective views of magnetic closures of the of pipe insulation shown in FIG. 1.

FIG. 2C illustrates perspective views of additional examples of magnetic closures according to further embodiments.

DEFINED DESCRIPTION

Figure 3:
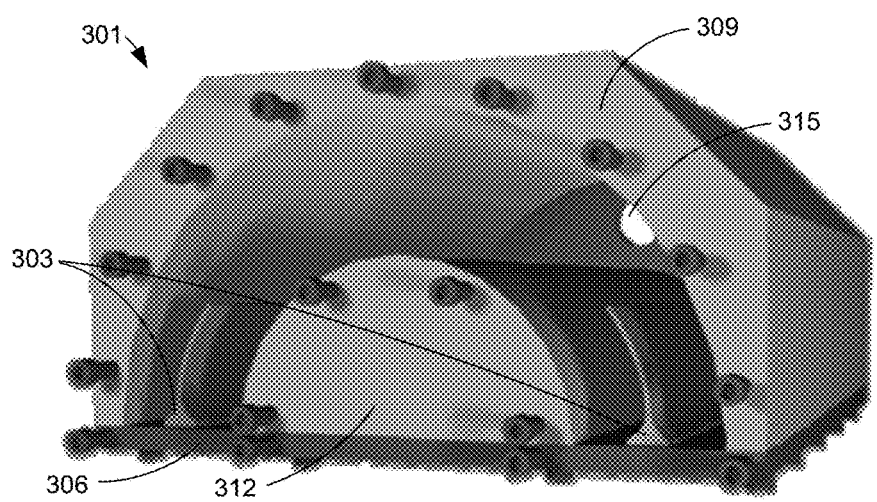
FIG. 3 illustrates a perspective view of an example insulation mold for pipe insulation having magnetic closures according to an embodiment.

Magnetic closures for pipe insulation are disclosed herein. The term magnetic can include any material capable of producing a magnetic field, for example, ferromagnetic materials, and can be anisotropically or isotropically charged. As used herein, the term magnetic closure can refer to any object that can be used in conjunction with another object to hold something together or to hold something closed via a magnetic field. For example, a magnetic closure that is magnetized can be attracted to another magnetic closure that is also magnetized. Alternatively, a magnetic closure can produce an attraction with a closure that is not itself magnetized. For example, a magnetic closure can refer to a closure of ferrous or ferromagnetic material that is not magnetized, but is configured to mate with a corresponding magnetic closure that is magnetized. In some embodiments, the magnetic material can incorporate materials compatible with the pipe insulation, for example, magnetic material can be made of 80% neodymium and 20% polyurea. In further embodiments, magnetic material can include other insulation materials, and in different proportions. Magnetic material can alternatively not include any insulation material.

Pipe insulation can, for example, be formed of polyisocyanurate, or other material suitable for the application. Polystyrene, polyethylene, polyolefin, polyurethane, polyisocyanurate, polymide, phenolic foams, elastomeric foams, cellular glass, silica aerogel, mineral fiber, high temperature fiber, perlite, microporous, granular, calcium silicate, textile glass, melamine, polyurea, fiberglass, PVC jacket, PVDC film, metal rolls and sheets, and other pipe insulation materials can also be used along with magnetic closures.

Pipe insulation may be used on various pipes for a variety of purposes, and can be made separately such that it can be attached to the various pipes. Such attachment can be done before the pipes are installed or sometime thereafter. Where pipes are installed in a location before insulation is attached, the pipe insulation can be made to facilitate such later attachment or installation. To this end, pipe insulation can have one or more longitudinal splits along its length, or can be made in multiple pieces, in order to facilitate attachment to pipe sections.

As used herein, the term "split" can refer to any location where pipe insulation comes together to form its intended shape. For example, the pipe insulation can be formed in the intended shape and subsequently cut, forming the split(s), or the pipe insulation can be initially formed with the split(s). Where pipe insulation has more than one split, the pipe insulation can be said to have multiple parts. Each part of the pipe insulation can be formed individually and later put together, or can be formed in the intended shape and subsequently separated, forming the splits and the multiple parts. A split can also be referred to as a slit, a separation, a cut, among other terms.

Insulation can be attached to different shapes of pipes. Pipes can be substantially tubular in shape, having a certain length and diameter. Insulation for cylindrical pipes can be a corresponding tubular shape that substantially surrounds or envelops the outside of the tubular pipe. Accordingly, the pipe insulation can have an inside diameter that is at least as large the outside diameter of the corresponding pipe.

Pipe insulation can have a split along its length that allows the pipe insulation to be attached by slipping it over the length of the pipe via the split. Once the pipe insulation is in place, a magnetic closure or closures for the split can be used to keep the split from opening, thereby keeping pipe insulation substantially around the pipe.

Pipe insulation can also be made in more than one piece. The pipe insulation can have two or more splits along its length, resulting in two or more pieces. In one embodiment, pipe insulation can be made in two lengthwise halves of a tube. Once the pipe insulation is placed around the pipe, a magnetic closure or closures can be used to secure the two halves together.

Sections of tubular pipe can be straight along its length, or can comprise one or more curves, forming an elbow or more complex curved shape. Where the pipe has a curve or curves along its length, insulation can have a corresponding curve. Pipes can also have other shapes, such as a square tube, hexagonal tube, or other shape as can be understood. Corresponding insulation can be made to substantially surround or envelop the outer sides of a section of any shape of pipe.

Sections of pipe can be joined or connected using a variety of pipe fittings, each of which can also have corresponding pipe insulation to substantially cover the outside of each fitting. Pipe fittings include ells, tees, wyes, elbows, couplings, unions, reducers, among other types of fittings. Corresponding pipe insulation for pipe fittings can also include splits, halves, or multiple pieces, and can utilize a magnetic closure or closures to keep the insulation in place once attached or installed on the pipe fittings.

Turning now to the drawings, various structural and functional aspects of the embodiments are described in further detail. It should be appreciated that the drawings are illustrative of examples. Further devices may look substantially different, while incorporating the principles described herein.

FIG. 1 illustrates a perspective view of an example of pipe insulation 100 having magnetic closures according to one embodiment. It should be appreciated that the pipe insulation 100 and magnetic closures illustrated in FIG. 1 are provided by way of example only. In other words, the embodiments of magnetic closures for pipe insulation described herein may vary in size, shape, and form, and can be used for insulating any type of pipe, pipe fitting, etc. The embodiment shown in FIG. 1 is representative and not intended to be limiting of the embodiments.

The pipe insulation 100 has a substantially tubular shape when assembled. The pipe insulation 100 is made of two lengthwise or longitudinal halves of the tubular shape, including a top lengthwise half 102 and a bottom lengthwise half 104 as shown in FIG. 1. While the terms "top" and "bottom" are used for referring to the top half 102 and the bottom half 104, the pipe insulation 100 can be oriented at any angle. Thus, the terms "top" and "bottom" are used for clarity in view of the orientation of the pipe insulation 100 as shown in FIG. 1. In other embodiments, the pipe insulation 100 can be any shape corresponding to a pipe or a pipe fitting.

The pipe insulation 100 can be said to have two lengthwise splits, a left split 106 and a right split 108. The terms left and right are merely used for clarity in view of the orientation of the pipe insulation as shown in FIG. 1. In other embodiments, pipe insulation can have a single split, or can have three or more splits.

The top half 102 has two lengthwise or longitudinal edges, a left lengthwise edge along the left split 106, and a right lengthwise edge along the right split 108. The bottom half 104 similarly has a left lengthwise edge and a right lengthwise edge, each lengthwise edge running along each of the splits 106 and 108, respectively.

A magnetic closure 110 is attached to the top half 102 of the pipe insulation 100 along the left lengthwise edge of the top half 102. In this embodiment, the magnetic closure 110 can be attached by the physical connection of the magnetic closure 110 in the material of the pipe insulation 100. For example, the magnetic closure 110 can be in an insulation mold, and the material of the pipe insulation 100 can be poured around it as a liquid, and can solidify around the magnetic closure 110, thereby attaching it to the pipe insulation 110. In other embodiments the magnetic closure can be attached using glue, epoxy, or other material, and may not be involved in a molding process. The magnetic closure 110 can further be attached by mechanical interference or friction upon insertion into insulation, or upon insulation being formed around the magnetic closure 110.

A magnetic closure 112 is attached to the top half 102 of the pipe insulation 100 along the right lengthwise edge of the top half 102. A magnetic closure 114 is attached to the bottom half 104 of the pipe insulation 100 along the left lengthwise edge of the bottom half 104. A magnetic closure 116 is attached to the bottom half 104 of the pipe insulation 100 along the right lengthwise edge of the bottom half 104. While the magnetic closures 110, 112, 114, and 116 each extend continuously along the respective lengthwise edges of respective halves of the pipe insulation 100, as shown in FIG. 1, the magnetic closures can also be segmented into any number of segments, and can be made in any shape. The segmented or continuous magnetic closures can be used substantially along the respective lengthwise edges of respective halves of the tube of pipe insulation 100. Note that while the magnetic closures 110, 112, 114, and 116 appear to extend well beyond the respective lengthwise edges, this is to illustrate the shape of each magnetic closure.

The magnetic closures 110, 112, 114, and 116 each have a fin or tail that extends into the pipe insulation. The fin can be used to help hold each of the magnetic closures 110-116 attached to the pipe insulation 100. Each fin is shown having a curve that substantially matches a curve of the tubular shape of the pipe insulation. In other embodiments, the fin can be straight, or otherwise shaped. While each fin tapers from each lengthwise edge as it extends into the pipe insulation 100, any shape can be used to hold the magnetic closure attached to the insulation 100.

While the magnetic closures 110, 112, 114, and 116 are shown as running continuously along the lengthwise edges, each can be made in one or more discrete sections, which can be shorter strips or any desired shape. For example, a plurality of discrete magnetic closures can be used along the respective lengthwise edges of the pipe insulation 100. Any shape can be used for discrete magnetic closures, including, for example, a segmented version of the magnetic closures 110, 112, 114, and 116, a mushroom or double mushroom shape, or simply round-shaped magnetic closures. The shape can be chosen based on holding power to the insulation, cost, or other factors.

The magnetic closure 110 is configured to magnetically mate with the closure 114. The magnetic closure 112 is configured to magnetically mate with the closure 116. In one embodiment, each of the magnetic closures 110, 112, 114, and 116 can be magnetized. In other embodiments, the magnetic closure 110 can be magnetized while the magnetic closure 114 is ferrous or ferromagnetic and not magnetized, or vice versa. Similarly, both of the magnetic closures 112 and 116 can be magnetized, or, in other embodiments, only one of the magnetic closures 112 and 116 is magnetized.

FIG. 2A illustrates a perspective view of the magnetic closures 112 and 116 while the magnetic closures 112 and 116 are separated. In this embodiment, the magnetic closure 112 has a magnetic strip 209 connected to a fin 215. The magnetic strip 209 can be designed with its poles aligned so that it can be sliced or cut, for example, at a point along the length of the magnetic strip 209, and still maintain its magnetic properties and its attraction to the magnetic strip 212. In other embodiments the magnetic strip 209 can be replaced with a ferrous or unmagnetized ferromagnetic material.

The fin 215 tapers from an end connected to the magnetic strip 209 to its other end. In other embodiments the fin may not taper, and can take another shape. The fin 215 is designed to facilitate attachment into pipe insulation, and is shown with a curve to substantially match pipe insulation to which it is to be inserted or attached. In this embodiment the fin 215 can be magnetic, while in other embodiments, the fin 215 is not magnetic.

The fin 215 can be used to provide a better attachment to the pipe insulation, as compared to the magnetic strip 209 alone. The fin can provide a greater surface area for mechanical interference or friction-based attachment to insulation, as well as for glue, epoxy, or other adhesives that can be utilized. In other embodiments, the fin 215 may not be present, and the magnetic strip or other magnetic closure can be connected to the pipe insulation.

The magnetic closure 116 is essentially a mirrored version of the magnetic closure 112. The magnetic closure 116 can have the properties discussed with respect to the magnetic closure 112, and be made in any of the embodiments discussed with respect to the magnetic closure 112. The magnetic closure 116 has a magnetic strip 212 connected to a fin 218. The magnetic closure 112 is configured to magnetically mate with the magnetic closure 116. In this embodiment, the magnetic strip 209 of the magnetic closure 112 is configured to magnetically mate with the magnetic strip 212 of the magnetic closure 116. In this embodiment, both of the magnetic closures 112 and 116 are magnetized. In other embodiments one of the closures can be magnetized while the other is not, but they can nevertheless be attracted magnetically. To this end, either of the magnetic closures 112 or 116 can instead be ferrous material or substantially un-magnetized ferromagnetic material. The connection of the non-magnetized mating part to the pipe insulation may be substantially different than the magnetized part. For example the non-magnetized strip could be laid on the surface and glued without any embedding.

FIG. 2B illustrates a perspective view of the magnetic closures 112 and 116 while the magnetic closures 112 and 116 are magnetically mated. The magnetic closure 112 is magnetically mated with the magnetic closure 116. In this embodiments, the magnetic strip 209 of the magnetic closure 112 is magnetically mated with the magnetic strip 212 of the magnetic closure 116. In other embodiments, each of the magnetic closures can be a single piece, or can have a different shape.

FIG. 2C illustrates perspective views of magnetic closures 220 and magnetic closures 230. The magnetic closures 220 are representative of one embodiment of a segmented version of the magnetic closures 110, 112, 114, and 116, for example. The magnetic closures 220 can be referred to as a plurality of discrete magnetic closures. Further embodiments can have a more rounded shape for each of the magnetic closure, or any other shape. The magnetic closures 230 are round, flat magnetic closures. The magnetic closures 230 can also be referred to as a plurality of discrete magnetic closures. In further embodiments, the magnetic closures 230 can also include a tail or fin. Many other types of magnetic closures can be made using the principles of the present disclosure. The magnetic closures 230 can also be referred to as magnetic inserts if part of a magnetic closure comprising at least the magnetic inserts as well as a tail or fin attached to the magnetic inserts.

FIG. 3 illustrates a perspective view of an insulation mold 301 that can be used to make insulation having magnetic closures 303. It should be understood that this is merely representative of one embodiment. Production may use adjusting molds, fixed molds, saws, extrusion or other means of fabrication known to those versed in the state of the art. Insulation having magnetic closures can be made in a variety of ways. FIG. 3 illustrates one way to form insulation through molding, for example, polyisocyanurate or other moldable insulation. Other types of insulation can be formed in a manner appropriate for the insulation type, and magnetic closures can be integrated into the process or inserted or attached later.

The magnetic closures 303 are shown having fins, but in other embodiments, the magnetic closures 303 may not have fins. In further embodiments, the magnetic closures can be any shape that fits within an insulation mold. The insulation mold 301 can further be any shape corresponding to a desired insulation shape. In yet further embodiments, magnetic closures may not be a part of the molding process, and can be inserted or attached to the insulation.

For viewing purposes, a front face of the insulation mold 301 is not shown, but can be attached using the plurality of screws shown on the face of the insulation mold 301. The bottom 306 of the insulation mold 301 is detachably secured to the top 309 of the insulation mold 301. In this embodiment, the bottom 306 is secured to the top 309 using a plurality of screws. The bottom 306 is also attached to a center 312 of the insulation mold 301.

In this embodiment, liquid insulation material can be poured through the hole 315 in a rear face of the insulation mold 301. In other embodiments, the hole 315 can be located anywhere on the insulation mold 301 to insert the insulation material into the insulation mold 301. In this embodiment, the rear face of the insulation mold 301 can be detachably secured using screws.

The magnetic closures 303 can be magnetically attached to the bottom 306 of the insulation mold 301. In one embodiment, one or more of the magnetic closures 303 can be magnetized, while the bottom 306 is not. In other embodiments, the bottom 306 can be magnetized while the magnetic closures 303 are not. In yet further embodiments, the magnetic closures are not magnetically attached to the bottom 306 of the insulation mold 301. In this embodiment, the top 309 and the center 312 are not magnetized, but in other embodiments, each can be magnetized.

Figure 4A:
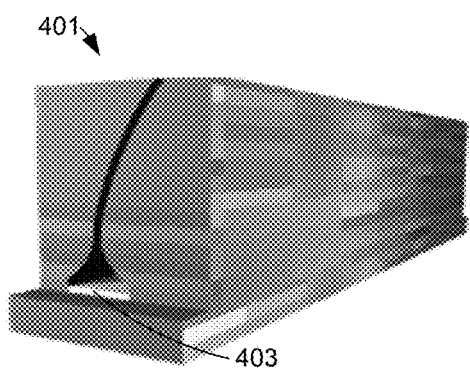
FIGS. 4A and 4B illustrate perspective views of an example magnetic closure mold according to an embodiment.

FIG. 4A illustrates a perspective view of a closure mold 401 for a magnetic closure. A magnetic strip 403 is on the bottom of the closure mold 401. In this embodiment, the magnetic strip 403 can be held magnetically to the bottom of the closure mold 401. In other embodiments, no magnetic strip is used and the closure mold 401 is used to form a magnetic closure, which can be magnetized or unmagnetized, and can be designed to be attracted to another magnetic closure. For example, a ferrous material can be used with the closure mold 401. The closure mold 401 can be any desired shape for a magnetic closure for attachment to or insertion into pipe insulation.

Figure 4B:
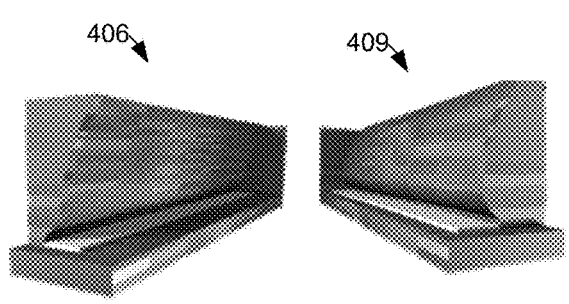

FIG. 4B illustrates perspective views of the closure mold 401 separated into a left side 406 and a right side 409. This is illustrative of the internal shape of the closure mold 401. In this rendering, the bottom of the closure mold is shown on each of the left side 406 and the right side 409. When assembled as seen in FIG. 4A, the closure mold 401 is a pourable mold for any material for attachment to or insertion into pipe insulation.

Figure 5:
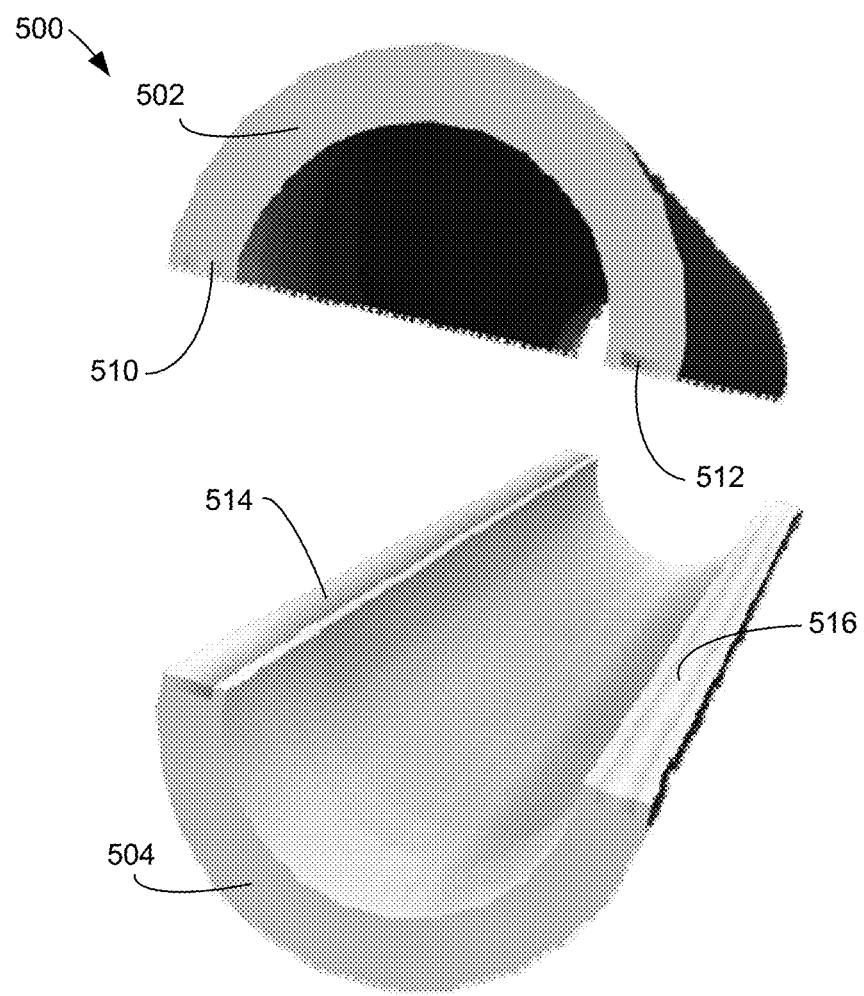
FIG. 5 illustrates a perspective view of an example of pipe insulation having magnetic closures according to another embodiment.

FIG. 5 illustrates a perspective view of an example of pipe insulation 500 having magnetic closures 510, 512, 514, and 516 according to an embodiment of the present disclosure. The pipe insulation 500 is substantially a tube. The pipe insulation 500 has a top lengthwise half 502 and a bottom lengthwise half 504 of the tube. The top lengthwise half 502 has the magnetic closure 510 inserted or attached along its left lengthwise edge, and the magnetic closure 512 attached along its right lengthwise edge. The bottom lengthwise half 504 has the magnetic closure 514 attached along its left lengthwise edge and the magnetic closure 516 attached along its right lengthwise edge. While the magnetic closures 510, 512, 514, and 516 are shown substantially inside the lengthwise edges, in other embodiments, the magnetic closures can be otherwise attached to the lengthwise edges. For example, magnetic closures can be attached to a surface of the lengthwise edge rather than inside the lengthwise edge, or can comprise a portion that is attached to the surface and a portion inserted into the lengthwise edges of the pipe insulation 500.

The magnetic closure 510 is designed to magnetically mate with the magnetic closure 514. To this end, at least one of the magnetic closure 510 and the magnetic closure 514 can be magnetized, while the other can be magnetized or unmagnetized. The magnetic closure 512 is designed to magnetically mate with the magnetic closure 516. To this end, at least one of the magnetic closure 512 and the magnetic closure 516 can be magnetized, while the other can be magnetized or unmagnetized. Each of the magnetic closures 510, 512, 514, and 516 can be designed such that they can be cut or split and retain their magnetic properties. While each of the magnetic closures 510, 512, 514, and 516 are shown as continuous strips, each can be made in one or more discrete sections, which can be shorter strips or any desired shape. For example, a plurality of discrete magnetic closures can be used along the respective lengthwise edges of the pipe insulation 500. Any shape can be used for discrete magnetic closures, including, for example, a segmented version of the magnetic closure 510, a mushroom or double mushroom shape, or simply round-shaped magnetic closures. The shape can be chosen based on holding power, cost, or other factors.

Figure 6:
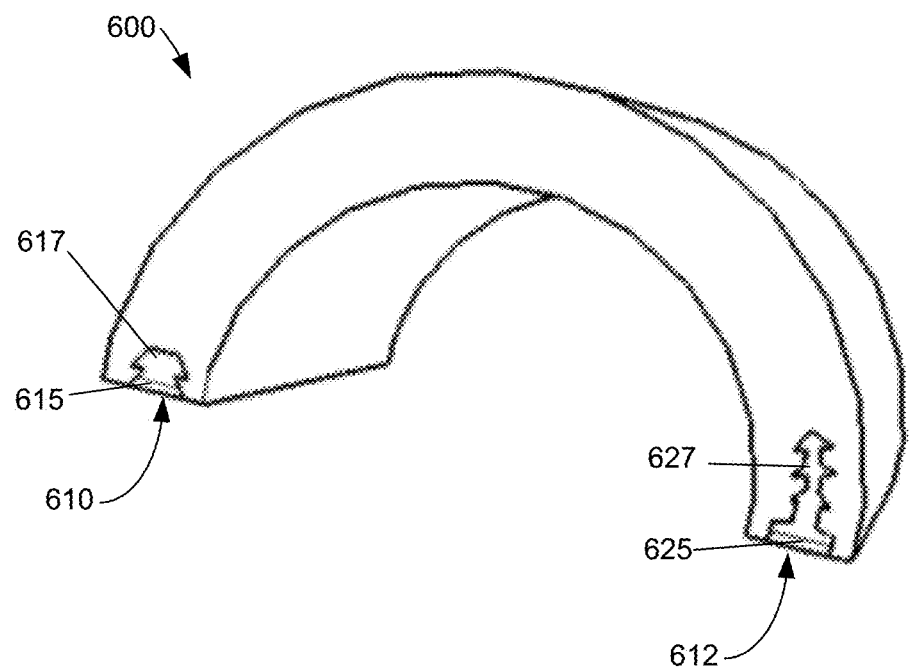
FIG. 6 illustrates a perspective view of an example of pipe insulation having magnetic closures according to yet another embodiment.

FIG. 6 illustrates a perspective view of an example of pipe insulation 600 having magnetic closures according to an embodiment of the present disclosure. The pipe insulation 600 is lengthwise half of a tube. A magnetic closure 610 is attached along its left lengthwise edge and a magnetic closure 612 is attached along its right lengthwise edge. While the magnetic closures 610 and 612 are shown having their mating faces substantially flush with each lengthwise edge, in other embodiments, the magnetic closures can cover all or part of the surface of each lengthwise edge.

The magnetic closure 610 has a magnetic face 615 and a fin or tail 617. The magnetic face 615 and the tail 617 can be made in a single piece, or as two parts. The magnetic face 615 can be magnetized or unmagnetized, and can be configured to be attracted to a corresponding magnetic face, for example, on the other half of the tube (not shown). The tail 617 is barbed, appearing like an arrow with a blunted or flattened nose. The barbs or arrow-like form can facilitate attachment to the pipe insulation 600 or facilitate retaining its hold to the pipe insulation 600, increasing its pullout strength. In other embodiments, any shape can be used for the tail 617.

Figure 7:
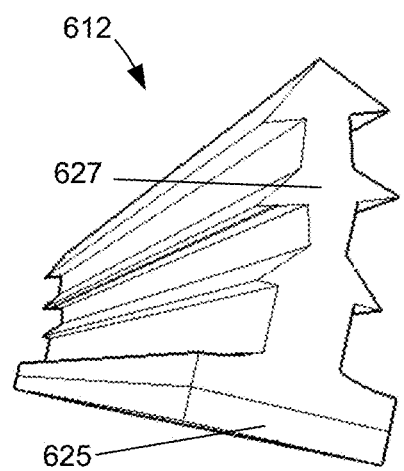
FIG. 7 illustrates a perspective view of an example magnetic closure of the pipe insulation shown in FIG. 6, according to an embodiment.

The magnetic closure 612 has a magnetic face 625 and a fin 627. The magnetic face 625 and the fin 627 can be made in a single piece, or as two parts. The magnetic face 625 can be magnetized or unmagnetized, and can be configured to be attracted to a corresponding magnetic face, for example, on the other half of the tube (not shown). The fin 627 has multiple arrow-like shapes, much like the tail 617, but having more arrows or barbs. The barbs or arrow-like form can facilitate attachment to the pipe insulation 600 or facilitate retaining its hold to the pipe insulation 600, increasing its pullout strength in some embodiments beyond that of the tail 617. In other embodiments, the magnetic closures 610 and 612 can be a plurality of discrete closures along the respective lengthwise edges of the pipe insulation 600. The magnetic closures 610 and 612 are illustrative of example shapes of magnetic closures that can be made using the principles described herein. In other embodiments, any shape can be used for the fins 617 and 627. FIG. 7 is a perspective view showing additional detail of the magnetic closure 612, the magnetic face 625, and the fin 627.

Figure 8:
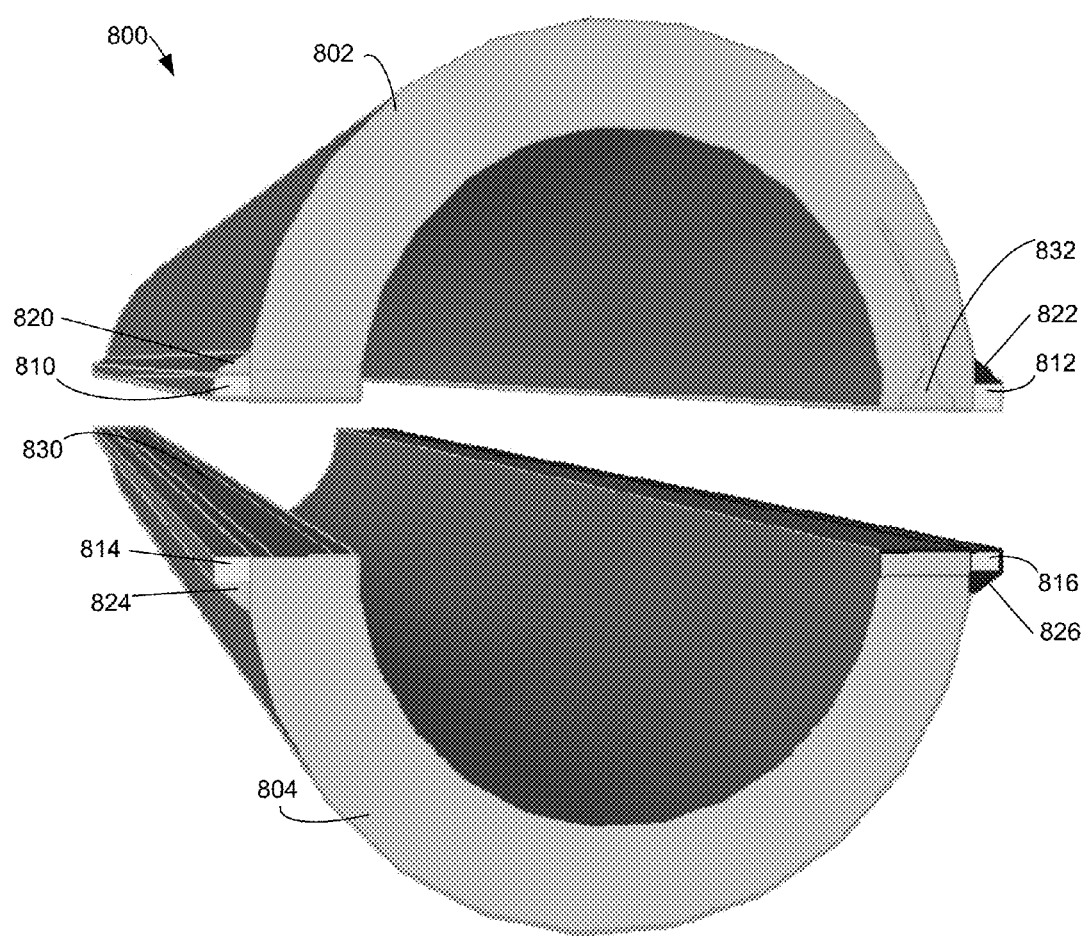
FIG. 8 illustrates a perspective view of an example of pipe insulation having magnetic closures according to a further embodiment.

FIG. 8 illustrates a perspective view of an example of pipe insulation 800 having magnetic closures according to an embodiment of the present disclosure. The pipe insulation 800 is substantially a tube. The pipe insulation 800 has a top lengthwise half 802 and a bottom lengthwise half 804 of the tube, and can be said to have two lengthwise splits. In other embodiments, the pipe insulation 800 can have more or fewer splits in any orientation. The top lengthwise half 802 has a magnetic closure 810 attached to the outside surface of the pipe insulation 800 adjacent to the left lengthwise edge of the top half 802. A magnetic closure 812 is attached along a right lengthwise edge of the top half 802. The bottom lengthwise half 804 has a magnetic closure 814 attached to the outside surface of the pipe insulation 800 adjacent to the left lengthwise edge of the bottom half 804. A magnetic closure 816 is attached along a right lengthwise edge of the bottom half 804.

The magnetic closures 810, 812, 814, and 816 are each continuous strips, but in other embodiments can be segmented, or can each be a plurality of magnetic closures, and can be made in any shape. The magnetic closures 810, 812, 814, and 816 can be designed with poles aligned so they can be split and retain their magnetic properties and attract. As with other magnetic closures discussed herein, each of the magnetic closures 810, 812, 814, and 816 can be magnetized or unmagnetized, but designed to attract to a corresponding magnetic closure. For example, the magnetic closure 810 can be magnetized while the magnetic closure 814 is unmagnetized, or vice versa.

The magnetic closure 810 has a support 820 that facilitates its attachment to the surface of the pipe insulation 800. The magnetic closure 812 has a support 822, the magnetic closure 814 has a support 824, and the magnetic closure 816 has a support 826. In other embodiments, the supports 820, 822, 824, and 826 may not be used.

The magnetic closures 810, 812, 814, and 816 can be used in lieu of, or in conjunction with any of the previously discussed magnetic closures. For example, a magnetic strip 830 is shown attached along the left lengthwise edge of the bottom half 804. A finned magnetic closure 832 is shown attached to the top half 802 along its right lengthwise edge.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made Therefore, the following is claimed:

1. An insulating apparatus, comprising:
   a first piece of insulating material having a first lengthwise half tube shape, a first lengthwise edge, and a second lengthwise edge;
   a first magnetic closure attached to the first lengthwise edge;
   a second magnetic closure attached to the second lengthwise edge;
   a second piece of insulating material having a second lengthwise half tube shape, a third lengthwise edge, and a fourth lengthwise edge;
   a third magnetic closure attached to the third lengthwise edge;
   a fourth magnetic closure attached to the fourth lengthwise edge, wherein the first piece of insulating material is configured to magnetically mate with the second piece of insulating material using the first, second, third, and fourth magnetic closures; and
   wherein at least one of the first magnetic closure, the second magnetic closure, the third magnetic closure, or the fourth magnetic closure comprises a magnetic strip attached to a fin that extends into at least a respective one of the first lengthwise edge, the second lengthwise edge, the third lengthwise edge, or the fourth lengthwise edge.

2. The insulating apparatus of claim 1, wherein at least one of the first, second, third, or fourth magnetic closures comprises at least one of: a magnetic strip or discrete magnetic inserts.

3. The insulating apparatus of claim 1, wherein at least another one of the first magnetic closure, the second magnetic closure, the third magnetic closure, or the fourth magnetic closure comprises unmagnetized ferromagnetic material.

4. The insulating apparatus of claim 1, wherein the fin comprises magnetic material.

5. The insulating apparatus of claim 1, wherein the fin tapers to a point from a first end to a second end.

6. The insulating apparatus of claim 5, wherein the fin is curved from the first end to the second end to match a curve of the tube shape.

7. The insulating apparatus of claim 1, wherein the fin comprises at least one barb.

8. An apparatus, comprising:
   pipe insulation comprising a first piece of insulating material and a second piece of insulating material, wherein a shape of the pipe insulation is substantially a tube designed to fit substantially around at least one of a pipe or a pipe fitting;
   a first plurality of magnetic closures attached to the first piece of insulating material, wherein the first piece of insulating material comprises a first lengthwise half of the tube and the first plurality of magnetic closures are attached along a first lengthwise edge and a second lengthwise edge of the first lengthwise half of the tube;
   a second plurality of magnetic closures attached to the second piece of insulating material, wherein the first plurality of magnetic closures are designed to magnetically mate with the second plurality of magnetic closures to hold the first piece of insulating material to the second piece of insulating material, wherein the second piece of insulating material comprises a second lengthwise half of the tube and the second plurality of magnetic closures are attached along a first lengthwise edge and a second lengthwise edge of the second lengthwise half of the tube; and
   wherein each of the first plurality of magnetic closures and the second plurality of magnetic closures comprises a magnetic strip attached to a tail, the tail extending into the pipe insulation along the respective lengthwise edges of the respective lengthwise half of the tube.

9. The apparatus of claim 8, wherein each of the first plurality of magnetic closures and the second plurality of magnetic closures comprises a magnetic strip attached to the pipe insulation along the respective lengthwise edges of the respective lengthwise half of the tube.

10. The apparatus of claim 8, wherein each of the first plurality of magnetic closures and the second plurality of magnetic closures comprises a magnetic strip attached to an outside surface of the tube adjacent to the respective lengthwise edges of the respective lengthwise half of the tube.

11. The apparatus of claim 8, wherein the tail tapers to a point from a first end attached to the magnetic strip to a second end that extends into the.

12. The apparatus of claim 8, wherein the tail comprises at least one barb.

* * * * *